United States Patent
Konig et al.

(10) Patent No.: US 10,313,521 B2
(45) Date of Patent: Jun. 4, 2019

(54) AUTOMATIC QUALITY MANAGEMENT OF CHAT AGENTS VIA CHAT BOTS

(71) Applicant: GENESYC TELECOMMUNICATIONS LABORATORIES, INC, Daly City, CA (US)

(72) Inventors: Yochai Konig, San Francisco, CA (US); David Konig, Tel Aviv (IL)

( * ) Notice: Subject to any disclaimer, the term of this patent is extended or adjusted under 35 U.S.C. 154(b) by 0 days.

(21) Appl. No.: 15/677,927

(22) Filed: Aug. 15, 2017

(65) Prior Publication Data

US 2019/0058793 A1 Feb. 21, 2019

(51) Int. Cl.
| | |
|---|---|
| H04M 3/51 | (2006.01) |
| H04L 12/58 | (2006.01) |
| G06F 17/27 | (2006.01) |

(52) U.S. Cl.
CPC ...... *H04M 3/5175* (2013.01); *G06F 17/2785* (2013.01); *H04L 51/02* (2013.01); *H04M 3/5183* (2013.01); *H04M 2203/401* (2013.01); *H04M 2203/403* (2013.01)

(58) Field of Classification Search
CPC ..... H04M 2203/401; H04M 2203/403; H04M 3/5175; H04M 2203/40; H04L 51/02
USPC ..... 379/265.07, 265.06, 265.03, 242, 265.05
See application file for complete search history.

(56) References Cited

U.S. PATENT DOCUMENTS

| | | | |
|---|---|---|---|
| 2002/0123925 A1* | 9/2002 | Smith | G06Q 30/02 705/14.19 |
| 2006/0256953 A1 | 11/2006 | Pulaski et al. | |
| 2008/0152121 A1 | 6/2008 | Mandalia et al. | |
| 2015/0032452 A1 | 1/2015 | Lev-Tov et al. | |
| 2015/0032746 A1 | 1/2015 | Lev-Tov et al. | |
| 2015/0195406 A1* | 7/2015 | Dwyer | H04M 3/5175 379/265.07 |
| 2016/0012818 A1 | 1/2016 | Faizakof et al. | |
| 2016/0188672 A1 | 6/2016 | Lev et al. | |
| 2016/0350699 A1 | 12/2016 | Vymenets et al. | |
| 2017/0018269 A1 | 1/2017 | Lev et al. | |

(Continued)

FOREIGN PATENT DOCUMENTS

| | | |
|---|---|---|
| KR | 1020050055327 A | 6/2005 |
| KR | 102016001090 A | 1/2016 |

OTHER PUBLICATIONS

U.S. Appl. No. 15/133,188, entitled "Quality Monitoring Automation in Contact Centers," filed Apr. 19, 2016.

(Continued)

*Primary Examiner* — Thjuan K Addy

(57) ABSTRACT

A method for automated quality management of agents of a contact center includes: selecting, by a processor, a topic for interacting with a human agent of the contact center; identifying, by the processor, a dialog tree associated with the selected topic; and engaging, by the processor, in an automated communication session with the human agent based on the identified dialog tree, wherein the engaging of the automated communication session includes: receiving, by the processor, an agent input; identifying, by the processor, a current node of the dialog tree associated with the agent input; selecting, by the processor, an automated phrase to be output in response to identifying the current node; and outputting, by the processor, the automated phrase.

20 Claims, 10 Drawing Sheets

(56) References Cited

U.S. PATENT DOCUMENTS

| | | |
|---|---|---|
| 2017/0098269 A1 | 4/2017 | Kim |
| 2017/0116173 A1 | 4/2017 | Lev-Tov et al. |
| 2017/0118336 A1 | 4/2017 | Tapuhi et al. |
| 2018/0096617 A1* | 4/2018 | Tapuhi ............... G06Q 10/0639 |

OTHER PUBLICATIONS

U.S. Appl. No. 15/282,963, entitled "System and Method for Automatic Quality Evaluation of Interactions," filed Sep. 30, 2016.
International Search Report and Written Opinion for Application No. PCT/US2018/046741, dated Dec. 4, 2018, 11 pages.
U.S. Appl. No. 13/952,459, entitled "System and Method for Discovering and Exploring Concepts," filed Jul. 26, 2013, 43 pages.
U.S. Appl. No. 14/327,476, entitled "System and Method for Semantically Exploring Concepts," filed Jul. 9, 2014, 47 pages.
U.S. Appl. No. 14/586,730, entitled "System and Method for Interactive Multi-Resolution Topic Detection and Tracking," filed Dec. 30, 2014, 52 pages.
U.S. Appl. No. 14/726,491, entitled "System and Method for Quality Management Platform," filed May 30, 2015, 37 pages.
U.S. Appl. No. 14/799,369, entitled "Data Driven Speech Enabled Self-Help Systems and Methods of Operating Thereof," filed Jul. 14, 2015, 52 pages.
U.S. Appl. No. 14/919,673, entitled "Data-Driven Dialogue Enabled Self-Help Systems," filed Oct. 21, 2015, 55 pages.
U.S. Appl. No. 14/919,675, entitled "Dialogue Flow Optimization and Personalization," filed Oct. 21, 2015, 55 pages.
U.S. Appl. No. 15/149,031, entitled "System and Method for Managing and Transitioning Automated Chat Conversations," filed May 6, 2016, 57 pages.

* cited by examiner

AUTOMATIC QUALITY MANAGEMENT OF CHAT AGENTS VIA CHAT BOTS

BACKGROUND

Generally, modern contact centers are staffed with agents or employees who serve as an interface between an organization, such as a company, and outside entities, such as customers. For example, human sales agents at contact centers may assist customers in making purchasing decisions and may receive purchase orders from those customers. Similarly, human support agents at contact centers may assist customers in solving problems with products or services provided by the organization. Interactions between contact center agents and outside entities (e.g., customers) may be conducted by speech voice (e.g., telephone calls or voice over IP or VoIP calls), video (e.g., video conferencing), text (e.g., emails and text chat), or through other media.

Quality monitoring in contact centers refers to the process of evaluating agents and ensuring that the agents are providing sufficiently high quality service in assisting the customers. Generally, a quality monitoring process will monitor the performance of an agent by evaluating the interactions that the agent participated in for events such as whether the agent was polite and courteous, whether the agent was efficient, and whether the agent was knowledgeable and proposed the correct solutions to resolve a customer's issue.

The above information disclosed in this Background section is for enhancement of understanding of the background of the invention, and therefore, it may contain information that does not constitute prior art.

SUMMARY

One or more aspects of example embodiments of the present invention are directed towards a system and method for utilizing an automated chat system to interact with human agents by emulating human customers, for purposes of quality management.

According to an example embodiment, a method for automated quality management of agents of a contact center includes: selecting, by a processor, a topic for interacting with a human agent of the contact center; identifying, by the processor, a dialog tree associated with the selected topic; and engaging, by the processor, in an automated communication session with the human agent based on the identified dialog tree, wherein the engaging of the automated communication session includes: receiving, by the processor, an input from the human agent; identifying, by the processor, a current node of the dialog tree associated with the input; selecting, by the processor, an automated phrase to be output in response to identifying the current node; and outputting, by the processor, the automated phrase.

In an embodiment, the method may further include: identifying, by the processor, a target agent input associated with the identified current node; semantically comparing, by the processor, the agent input to the target agent input; determining, by the processor, whether the agent input is semantically equivalent to the target agent input; calculating, by the processor, a performance score for the human agent based on the determining; and outputting, by the processor, feedback based on the determined performance score.

In an embodiment, the feedback may include a report summarizing the human agent's proficiencies and/or areas of improvement.

In an embodiment, the method may further include: invoking, by the processor, a coaching session for the human agent based on the feedback.

In an embodiment, the automated phrase may be selected from a plurality of phrases provided by human customers for a current dialog state during interactions with agents of the contact center, the interactions relating to the selected topic.

In an embodiment, the selecting of the automated phrase may further include: identifying, by the processor, frequency of each of the plurality of phrases for the current dialog state; and selecting, by the processor, one of the plurality of the phrases based on the identified frequency.

In an embodiment, the topic may be selected based on a criterion to be optimized by the contact center.

In an embodiment, the topic may be selected based on performance of the human agent during interactions with human customers relating to the topic.

In an embodiment, the topic may be selected based on performance of the human agent during previous automated communication sessions.

In an embodiment, the automated communication session may be a text based chat session.

According to an example embodiment of the present invention, a system for automated quality management of agents of a contact center includes: a processor; and a memory coupled to the processor and storing instructions that, when executed by the processor, cause the processor to: select a topic for interacting with a human agent of the contact center; identify a dialog tree associated with the selected topic; and engage in an automated communication session with the human agent based on the identified dialog tree, wherein the engaging of the automated communication session includes: receiving an input from the human agent; identifying a current node of the dialog tree associated with the input; selecting an automated phrase to be output in response to identifying the current node; and outputting the automated phrase.

In an embodiment, the instructions may further cause the processor to: identify a target agent input associated with the identified current node; semantically compare the agent input to the target agent input; determine whether the agent input is semantically equivalent to the target agent input; calculate a performance score for the human agent based on the determining; and output feedback based on the determined performance score.

In an embodiment, the feedback may include a report summarizing the human agent's proficiencies and/or areas of improvement.

In an embodiment, the instructions may further cause the processor to: invoke a coaching session for the human agent based on the feedback.

In an embodiment, the automated phrase may be selected from a plurality of phrases provided by human customers for a current dialog state during interactions with agents of the contact center, the interactions relating to the selected topic.

In an embodiment, the selecting of the automated phrase may further include: identifying frequency of each of the plurality of phrases for the current dialog state; and selecting one of the plurality of the phrases based on the identified frequency.

In an embodiment, the topic may be selected based on a criterion to be optimized by the contact center.

In an embodiment, the topic may be selected based on performance of the human agent during interactions with human customers relating to the topic.

In an embodiment, the topic may be selected based on performance of the human agent during previous automated communication sessions.

In an embodiment, the automated communication session may be a text based chat session.

BRIEF DESCRIPTION OF THE DRAWINGS

The above and other aspects and features of the present invention will become more apparent to those skilled in the art from the following detailed description of the example embodiments with reference to the accompanying drawings.

DETAILED DESCRIPTION

Figure 1A:
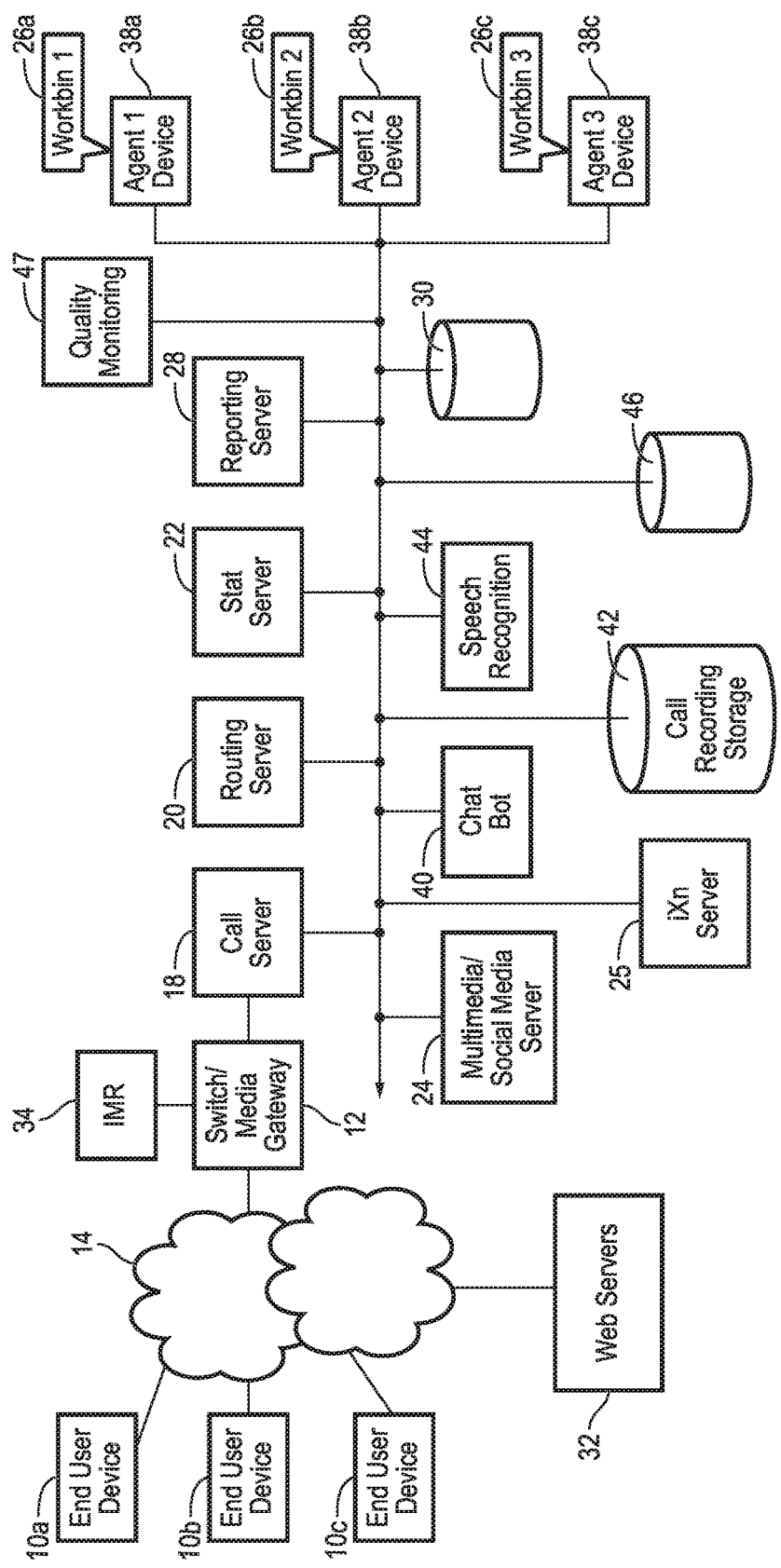
FIG. 1A is a schematic block diagram of a system for supporting a contact center in providing contact center services and automatic QM and coaching using automated chat sessions according to one example embodiment of the invention.

Hereinafter, example embodiments will be described in more detail with reference to the accompanying drawings, in which like reference numbers refer to like elements throughout. The present invention, however, may be embodied in various different forms, and should not be construed as being limited to the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated.

Aspects of embodiments of the present invention are directed to utilizing an automated chat robot to interact with a human agent by emulating human customers, and to evaluate the interaction in accordance with defined quality criteria. Typically, quality monitoring (QM) or quality management is performed to measure agent performance during interactions (e.g., calls, text chats, and email exchanges) between human agents and human customers, such as whether the agent was polite and courteous, and to measure agent effectiveness, such as whether the agent was able to resolve the customer's issue and was time efficient in doing so.

Systems for quality monitoring or quality management are described in U.S. patent application Ser. No. 14/726,491 "SYSTEM AND METHOD FOR QUALITY MANAGEMENT PLATFORM," filed in the United States Patent and Trademark Office on May 30, 2015, U.S. patent application Ser. No. 15/133,188 "QUALITY MONITORING AUTOMATION IN CONTACT CENTERS," filed in the United States Patent and Trademark Office on Apr. 19, 2016, and U.S. patent application Ser. No. 15/282,963 "SYSTEM AND METHOD FOR AUTOMATIC QUALITY EVALUATION OF INTERACTIONS," filed in the United States Patent and Trademark Office on Sep. 30, 2016, the entire disclosures of which are incorporated by reference herein.

As described in the referenced applications, interactions (e.g., recorded or live interactions) between human agents and human customers are evaluated by filling out evaluation forms (e.g., automatically or manually) to identify areas of concern. These interactions may include, for example, interactions containing profanity or interactions in which the agent did not thank the customer for their business.

After the evaluation, the agent may be provided with the results of the evaluation. Particularly notable evaluations (e.g., agents demonstrating egregiously inappropriate behavior or superb performance) may be provided to a supervisor or compliance officer. High quality interactions may be saved into a training library as models, and interactions deemed relevant to a particular product team (e.g., illustrating customer problems with products) may be provided to that product team for review.

One or more embodiments of the present invention are directed to systems and methods for utilizing an automated chat system (also referred to as a chat robot, chat automation module, or chat engine) to interact with human agents by emulating human customers, for purposes of conducting QM on the human agents, and/or training the human agents. According to some embodiments, the agents may not be aware that they are communicating with an automated chat system rather than a human customer. According to some embodiments, the dialogue for the automated chat system may be conducted based on machine learning that occurs upon evaluating recorded or live human customer dialogues in similar interactions for similar topics. According to some embodiments, the dialogue for the automated chat system may be selected based on probability or frequency of occurrence in the dialogue of the human customers.

Additionally, one or more embodiments of the present invention are directed to system and methods for utilizing an automated chat system to evaluate the human agent based on the interaction with the automated chat system. According to some embodiments, the agent may be evaluated based on responses to the dialogue of the automated chat system.

As will be appreciated by a person of skill in the art, one of the benefits of utilizing an automated chat robot for engaging in chat conversations with human agents and evaluating the human agents is that it helps contact centers to more efficiently ensure quality control of the human agents, while improving or maintaining customer satisfaction. For example, a chat robot may be invoked to engage with the human agent for various topics of interest, without the human agent knowing that it is conversing with a chat robot. The conversation topic and flow and may be controlled by the chat robot, and the human agent may be evaluated under various real life scenarios. Thus, quality monitoring may be more streamlined, and evaluations and feedback may be provided in real time (e.g., during the conversation, or shortly thereafter).

In the various embodiments, the terms interaction and communication are used generally to refer to any real-time and non-real time interaction that uses any communication channel including, without limitation telephony calls (PSTN or VoIP calls), emails, vmails (voice mail through email), video, chat, screen-sharing, text messages, social media messages, web real-time communication (e.g. WebRTC calls), and the like.

Contact Center Overview

FIG. 1A is a schematic block diagram of a system for supporting a contact center in providing contact center services and automatic QM and coaching using automated chat sessions according to one example embodiment of the invention.

The contact center may be an in-house facility to a business or corporation for serving the enterprise in performing the functions of sales and service relative to the products and services available through the enterprise. In another aspect, the contact center may be a third-party service provider. The contact center may be deployed in equipment dedicated to the enterprise or third-party service provider, and/or deployed in a remote computing environment such as, for example, a private or public cloud environment with infrastructure for supporting multiple contact centers for multiple enterprises. The various components of the contact center system may also be distributed across various geographic locations and computing environments and not necessarily contained in a single location, computing environment, or even computing device.

According to one exemplary embodiment, the contact center system manages resources (e.g. personnel, computers, and telecommunication equipment) to enable delivery of services via telephone or other communication mechanisms. Such services may vary depending on the type of contact center, and may range from customer service to help desk, emergency response, telemarketing, order taking, and the like.

Customers, potential customers, or other end users (collectively referred to as customers) desiring to receive services from the contact center may initiate inbound telephony calls to the contact center via their end user devices 10a-10c (collectively referenced as 10). Each of the end user devices 10 may be a communication device conventional in the art, such as, for example, a telephone, wireless phone, smart phone, personal computer, electronic tablet, and/or the like. Users operating the end user devices 10 may initiate, manage, and respond to telephone calls, emails, chats, text messaging, web-browsing sessions, and other multi-media transactions.

Inbound and outbound telephony calls from and to the end users devices 10 may traverse a telephone, cellular, and/or data communication network 14 depending on the type of device that is being used. For example, the communications network 14 may include a private or public switched telephone network (PSTN), local area network (LAN), private wide area network (WAN), and/or public wide area network such as, for example, the Internet. The communications network 14 may also include a wireless carrier network including a code division multiple access (CDMA) network, global system for mobile communications (GSM) network, or any wireless network/technology conventional in the art, including but to limited to 3G, 4G, LTE, and the like.

According to one exemplary embodiment, the contact center includes a switch/media gateway 12 coupled to the communications network 14 for receiving and transmitting telephony calls between end users and the contact center. The switch/media gateway 12 may include a telephony switch configured to function as a central switch for agent level routing within the center. The switch may be a hardware switching system or a soft switch implemented via software. For example, the switch 12 may include an automatic call distributor, a private branch exchange (PBX), an IP-based software switch, and/or any other switch configured to receive Internet-sourced calls and/or telephone network-sourced calls from a customer, and route those calls to, for example, an agent telephony device. In this example, the switch/media gateway establishes a voice path/connection (not shown) between the calling customer and the agent telephony device, by establishing, for example, a connection between the customer's telephony device and the agent telephony device.

According to one exemplary embodiment of the invention, the switch is coupled to a call controller 18 which may, for example, serve as an adapter or interface between the switch and the remainder of the routing, monitoring, and other call-handling components of the contact center.

The call controller 18 may be configured to process PSTN calls, VoIP calls, and the like. For example, the call controller 18 may include a session initiation protocol (SIP) server for processing SIP calls. According to some exemplary embodiments, the call controller 18 may, for example, extract data about the customer interaction such as the caller's telephone number, often known as the automatic number identification (ANI) number, or the customer's internet protocol (IP) address, or email address, and communicate with other CC components and/or CC iXn server 25 in processing the call.

According to one exemplary embodiment of the invention, the system further includes an interactive media response (IMR) server 34, which may also be referred to as a self-help system, virtual assistant, or the like. The IMR server 34 may be similar to an interactive voice response (IVR) server, except that the IMR server is not restricted to voice, but may cover a variety of media channels including voice. Taking voice as an example, however, the IMR server may be configured with an IMR script for querying calling customers on their needs. For example, a contact center for a bank may tell callers, via the IMR script, to "press 1" if they wish to get an account balance. If this is the case, through continued interaction with the IMR, customers may complete service without needing to speak with an agent. The IMR server 34 may also ask an open ended question such as, for example, "How may I assist you?" and the customer may speak or otherwise enter a reason for contacting the contact center. The customer's speech may then be processed by a speech recognition module 44 and the customer's response may then be used by the routing server 20 to route the call to an appropriate contact center resource.

In some embodiments, the routing server 20 may query a customer database, which stores information about existing clients, such as contact information, service level agreement (SLA) requirements, nature of previous customer contacts and actions taken by contact center to resolve any customer issues, and the like. The database may be, for example, Cassandra or any non-SQL database, and may be stored in a mass storage device 30. The database may also be a SQL database an may be managed by any database management system such as, for example, Oracle, IBM DB2, Microsoft SQL server, Microsoft Access, PostgreSQL, MySQL, FoxPro, and SQLite. The routing server 20 may query the customer information from the customer database via an ANI or any other information collected by the IMR server 34.

Once an appropriate agent is identified as being available to handle a communication, a connection may be made between the customer and an agent device 38a-38c (collectively referenced as 38) of the identified agent. Collected information about the customer and/or the customer's historical information may also be provided to the agent device for aiding the agent in better servicing the communication. In this regard, each agent device 38 may include a telephone adapted for regular telephone calls, VoIP calls, and the like. The agent device 38 may also include a computer for communicating with one or more servers of the contact center and performing data processing associated with contact center operations, and for interfacing with customers via voice and other multimedia communication mechanisms such as text based chat.

The contact center system may also include a multimedia/social media server 24 for engaging in media interactions other than voice interactions with the end user devices 10. The media interactions may be related, for example, to email, vmail (voice mail through email), chat, video, text-messaging, web, social media, co-browsing, and the like. In this regard, the multimedia/social media server 24 may take the form of any IP router and/or engine conventional in the art with specialized hardware and software for receiving, processing, and forwarding multi-media events.

According to one embodiment, the multimedia/social media server 24 is coupled to the interaction(iXn) server 25. The interaction server 25 is configured to identify non-voice interactions identified by the multimedia/social media server 24, and process the interactions for routing to contact center agents.

According to one exemplary embodiment of the invention, in addition to real-time interactions, deferrable (also referred to as back-office or offline) interactions/activities may also be routed to the contact center agents. Such deferrable activities may include, for example, responding to emails, responding to letters, attending training seminars, or any other activity that does not entail real time communication with a customer. In this regard, the interaction (iXn) server 156 interacts with the routing server 124 for selecting an appropriate agent to handle the activity. Once assigned to an agent, an activity may be pushed to the agent, or may appear in the agent's workbin 26a-26c (collectively referenced as 26) as a task to be completed by the agent. The agent's workbin may be implemented via any data structure conventional in the art, such as, for example, a linked list, array, and/or the like. The workbin 26 may be maintained, for example, in buffer memory of each agent device 38.

According to one exemplary embodiment of the invention, the mass storage device(s) 30 may store one or more databases relating to agent data (e.g. agent profiles, schedules, etc.), customer data (e.g. customer profiles), interaction data (e.g. details of each interaction with a customer, including reason for the interaction, disposition data, time on hold, handle time, etc.), and the like. According to one embodiment, some of the data (e.g. customer profile data) may be maintained in a customer relations management (CRM) database hosted in the mass storage device 30 or elsewhere.

The mass strorage device(s) 30 may also store other data and information used in the various embodiments of the present invention, including, for example, a database of interaction topics and associated dialog trees, agent QM data/scores, and the like.

According to one embodiment, the system includes other mass storage devices including a call recording storage device 42 and a recognized text storage device 46. The various mass storage devices 30, 42, 46 of the system may take form of a hard disk or disk array as is conventional in the art.

The call recording storage device 42 may be configured to store audio recordings of telephony calls to and from the contact center. Recorded and/or live calls may be analyzed by a speech recognition module 44 to generate recognized text. The recognized text is then stored in a recognized text storage device 46. The contact center system may additionally include a chat automation server (also referred to as a chat bot or chat robot) 40 configured to impersonate, mimic, or model a real customer for engaging in automated/electronic chat communications with agents operating the agent devices 38.

According to one embodiment, the chat bot 40 is configured to conduct an automated chat communication with a particular agent based on a dialog tree or script provided by a quality monitoring (QM) system 47. The dialog tree or script may be associated with a particular type or customer and/or call intent. According to one embodiment, each node of the tree is indicative of an action and/or dialog expected from the contact center agent. Dialog progresses as the agent takes the action and/or dialog at each node, and receives necessary response from the chat bot to move to a next node of the tree. As the customer chat bot conducts the automated chat session with the agent based on the selected dialog tree, the chat bot transmits live chat information to the QM system 47 for analysis and/or action.

In the embodiment of FIG. 1A, the customer chat bot 40 is depicted as being a module or component separate from the other modules and components of the contact center system. However, a person of skill in the art should recognize that functionalities of the chat bot may be incorporated into the multimedia/social media server 24, the IMR server 34, the QM system 47, or the like. Also, although embodiments of the present invention are described in reference to a single chat bot 40, a person of skill in the art should recognize that the contact center system may also maintain different chat bots for use in different scenarios as is described in further detail in U.S. patent application Ser. No. 15/149,031, entitled "System and Method for Managing and Transitioning Automated Chat Conversations," the content of which is incorporated herein by reference. For example, different chat bots may be provided for QM analysis and coaching. Different chat bots may also be maintained for different interaction topics, or for exhibiting different personalities or moods. In addition, although the mode of interaction between the customer chat bot and the human agents is text, a person of skill in the art should appreciate that embodiments of the invention may extend to voice communication by converting the text responses output by the chat bot into speech that is delivered to the human agent, and converting the speech responses output by the human agent into text that is delivered to the customer chat bot.

According to embodiments of the present invention, the QM system 47 may access the recorded calls stored in the call recording storage device 42 and/or the recognized text stored in the recognized text storage device 46, and analyze the recorded calls and/or recognized text to determine a universe of potential topics for the automatic chat interaction between the chat robot 40 and the human agent. The QM system 47 may then provide the dialog tree or script for a selected topic of interaction to the customer chat bot for engaging in the automated chat interaction with the agent. According to one embodiment, different dialog trees are maintained for different topics of interaction.

During and/or after the chat interaction between the customer chat bot and the agent, the interaction may be analyzed for feedback and/or coaching. Reports may also be generated based on the analysis of the chat interaction for updating, for example, the agent's performance profile. According to one embodiment, the QM system 47 may also be invoked as a testing tool for training agents before those agents start servicing real customers.

Figure 1B:
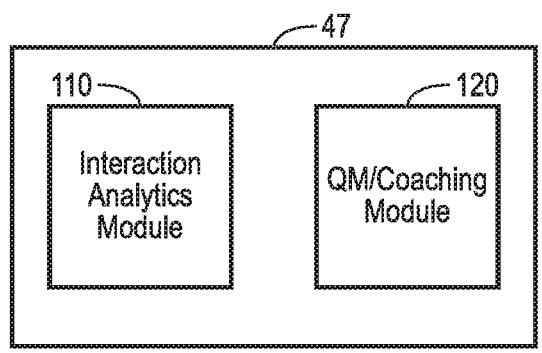
FIG. 1B is a more detailed block diagram of the QM system shown in FIG. 1A according to one embodiment of the invention.

FIG. 1B is a more detailed block diagram of the QM system 47 according to one embodiment of the invention. The QM system 47 may include, for example, an interaction analytics module 110 and a QM/coaching module 120. Although these modules are assumed to be separate functional units, a person of skill in the art will recognize that the functionality of the modules may be combined or integrated into a single module, or further subdivided into further sub-modules without departing from the spirit of the invention.

According to one embodiment, the interaction analytics module 110 is configured to receive and analyze live chat information of chat interactions between the customer chat bot 40 and human agents. The analysis may entail analyzing a particular response of an agent during the chat session for determining a next action(s) to be taken by the chat bot in response. The next action might be, for example, selection of a next state of the dialog tree to which the chat bot should transition, selection of an appropriate real time feedback to the agent, or the like.

The interaction analytics module 110 may also be invoked to analyze voice or non-voice interactions with real customers of the contact center for learning dialog patterns and correlation with contact center goals such as, for example, first call resolution, customer satisfaction, compliance with guidelines, policies, and procedures, and the like. For example, a dialog tree or sequence for modeling a successful first call resolution for a particular topic may be learned and maintained. An actual dialog sequence between the customer chat bot and a particular agent may then be compared to the modeled dialog tree or sequence for determining any diversions in the actual dialog sequence to the modeled dialog sequence. The diversions may be indicative of areas/skills that need improvement. Adherence to the modeled dialog sequence may be indicative of the agent's proficiency in handling the particular interaction topic.

The voice or non-voice interactions with the real customers may also be analyzed for modeling dialog sequences involving customers exhibiting certain characteristics. For example, a dialog model for particular topic where the customer is angry or impatient may be generated and maintained by the system. The specific dialog tree that is selected for use by the customer chat bot in assessing a particular agent may depend on the type of assessment or coaching that is desired for the particular agent.

According to one embodiment, the QM/coaching module 120 may be configured to monitor and identify criteria for triggering an automated chat interaction between the customer chat bot and a contact center agent, for purposes of quality management (or monitoring or assessment), and/or coaching (collectively referred to as quality management). The QM/coaching module 120 may also be configured to select an interaction topic and associated dialog script appropriate for conducting the assessment or coaching. As the interaction is conducted and responses by the agent are analyzed by the interaction analytics module 110, the QM/coaching module 120 may, in one embodiment, provide real time feedback to the agent and/or supervisor. In other embodiments, the feedback provided by the QM/coaching module 120 may be after the interaction is over. A coaching session may be scheduled by the supervisor in response to the feedback. In some embodiments, the scheduling of the coaching session may be done automatically by the QM/coaching module 120 in response to the agent's performance during the chat interaction being lower than a set threshold.

Figure 1C:
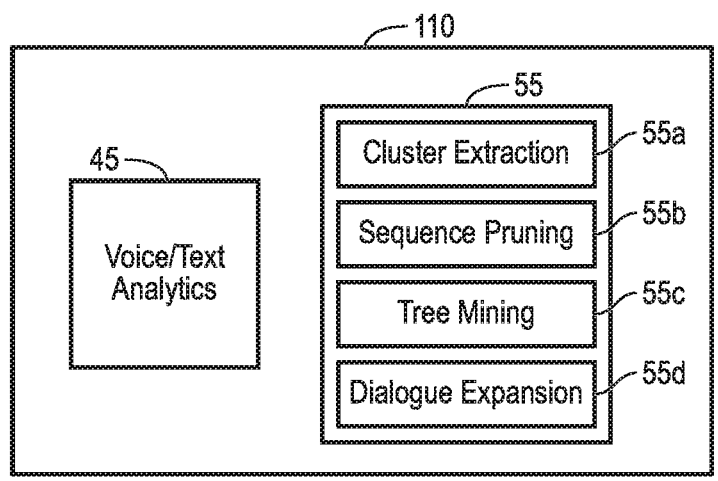
FIG. 1C is a more detailed block diagram of the interaction analytics module shown in FIG. 1B according to one embodiment of the invention.

FIG. 1C is a more detailed block diagram of the interaction analytics module 110 according to one embodiment of the invention. The interaction analytics module 110 may include a voice/text analytics module 45 configured to perform analytics of responses from an agent during an interaction with the customer chat bot 40 for recognizing the responses and identifying semantically equivalent responses using mechanisms similar to the mechanisms disclosed in U.S. patent application Ser. No. 14/327,476 "System and Method for Semantically Exploring Concepts," filed in the United States Patent and Trademark Office on Jul. 9, 2014, the content of which is incorporated herein by reference.

With such semantic understanding, the interaction analytics module 110 may determine whether the responses by the agents match expected responses for assessing the agents' performances during the interactions. The interaction analytics module 110 may also be invoked for automatically generating and/or expanding dialog trees to be used by the customer chat bot in engaging in automated chat interactions with human agents, according to one embodiment of the invention. In this regard, the interaction analytics module 110 includes a dialogue configuration module 55 to generate a dialogue tree for the chat robot to interact with the human agent for a selected topic. The configuration module may include a cluster extraction module 55a, a user interface module 55b, a sequence pruning module 55c, a tree mining module 55d, and a dialogue expansion module 55e. Aspects of dialogue tree generation are described, for example, in U.S. patent application Ser. No. 14/799,369 "Data Driven Speech Enabled Self-Help Systems and Methods of Operating Thereof," filed in the United States Patent and Trademark Office on Jul. 14, 2015, U.S. patent application Ser. No. 14/919,673 "Data-Driven Dialogue Enabled Self-Help Systems," filed in the United States Patent and Trademark Office on Oct. 21, 2015, and U.S. patent application Ser. No. 14/919,675 "Dialogue Flow Optimization and Personalization," filed in the United States Patent and Trademark Office on Oct. 21, 2015, the entire disclosures of which are incorporated herein by reference.

The interaction analytics module 110 may also be invoked for automatically learning a set of topics that may be the subject of a dialog between the customer chat bot 40 and the human agents. Additional detail regarding analytics systems and methods for automatically detecting and tracking topics can be found, for example, in: U.S. patent application Ser. No. 13/952,459 "System and Method for Discovering and Exploring Concepts," filed in the United States Patent and Trademark Office on Jul. 26, 2013; U.S. patent application Ser. No. 14/327,476 "System and Method for Semantically Exploring Concepts," filed in the United States Patent and Trademark Office on Jul. 9, 2014; and U.S. patent application Ser. No. 14/586,730 "System and Method for Interactive Multi-Resolution Topic Detection and Tracking," filed in the United States Patent and Trademark Office on Dec. 30, 2014, the entire disclosures of which are incorporated by reference herein.

Quality Monitoring by Automated Chat Robot

Figures 2, 3:
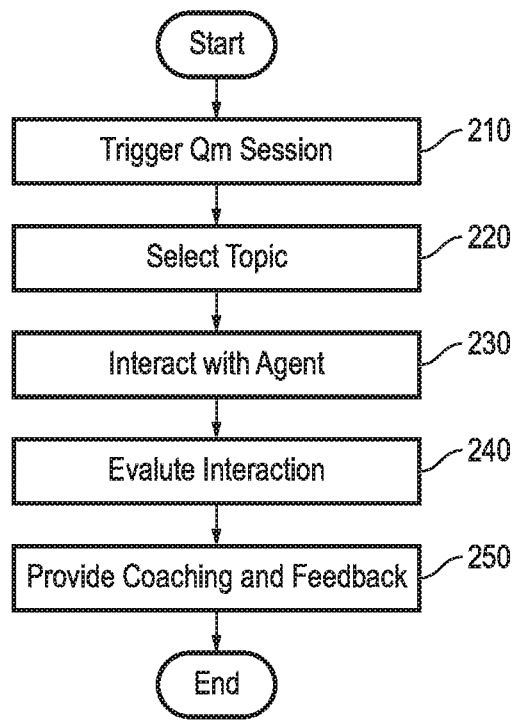
FIG. 2 is a flowchart of a process for quality management via an automated chat robot according to one embodiment of the invention.
FIG. 3 is a conceptual layout diagram of an exemplary table that may be used to select one or more topics for the interaction between the chat robot and a particular agent selected for evaluation according to one embodiment of the invention.

FIG. 2 is a flowchart of a process for quality management via an automated chat robot according to one embodiment of the invention. Referring to FIG. 2, the QM/coaching module 120 detects, at operation 210, a criteria for triggering a quality management session with a particular human agent. For example, the quality management session may be triggered based on an elapsed time since a last quality management session or coaching session with the chat robot or with a human supervisor, based on a set schedule (e.g., predetermined schedule by the supervisor or the QM system or a random schedule), based on idle time of the agent exceeding some threshold (e.g., over 30 minutes), based on agent performance indicators (e.g., average handling time or first call resolution falling below a threshold), based on bad survey scores (e.g., from after call survey by a customer), and/or the like.

Once the quality management session for the particular agent has been triggered, the QM/coaching module selects, at operation 220, one or more interaction topics for the interaction with the particular agent. Broadly, an interaction topic relates to a subject or intent for the interaction. According to one embodiment, the interaction analytics module 110 may be configured to learn different topics and recommend one or more of the learned interaction topics based on the event that triggered the QM session. The different topics may be learned, for example, based on analysis of voice and non-voice interactions of the contact center.

According to one embodiment, a particular interaction topic may be constructed from one or more phrases that are identified as relating or corresponding to that topic. For example, phrases such as: "delinquent balance," "past due," "delinquency notice," and "set up payment arrangement," may be associated with an interaction topic termed "delinquency." Topics can be grouped together into "meta topics" and meta topics may be grouped with other meta topics and/or topics to form a semantic hierarchy or taxonomy of meta topics and topics.

As it relates herein, the topic that is selected as the subject of the chat interaction between the customer chat bot and a particular agent may be based on, for example, a problematic area of the particular agent. In other examples, the interaction topic may relate to compliance to ensure that company guidelines, policies, and/or procedures are being followed during the agent-customer interactions. The topic selected for the interaction may be a single topic with one or more associated meta topics, or a mix of topics and meta topics.

After determining the one or more topics for the interaction with the agent, the chat robot 40 interacts with the human agent at operation 230 based on one or more dialogue trees associated with the one or more topics. In this regard, the QM/coaching module 120 retrieves from the mass storage device 30 the dialog tree associated with the selected interaction topic. According to one embodiment, the dialogue trees stored in the mass storage device are generated by evaluating recorded and/or live voice and text interactions between human customers and human agents. Thus, the responses (or phrases) that are output by the chat robot emulate actual human customers' responses under various real-life scenarios.

According to one embodiment, the chat robot may initiate a chat (or text) interaction with the human agent without the human agent being aware that she is interacting with a chat robot. In this regard, unlike traditional chat bot systems where the chat bot emulates a contact center agent, the chat bot according to embodiments of the present invention emulates the customer behavior.

According to embodiments of the present invention, in conducting a chat interaction between the chat robot and a human agent, the chat robot may choose a response (or phrase) to output from a plurality of candidate (or possible) responses to a dialog corresponding to a current node of the selected dialogue tree. The corresponding response may be chosen based on, for example, frequency or probability of the corresponding response occurring in the evaluated interactions between human customers and human agents. In one embodiment, if the agent has been previously evaluated for the selected interaction topic, the corresponding response may be chosen as a response that is different from a response that was output during the previous evaluation.

Further, the corresponding response may be chosen based on performance of the human agent, or a level of difficulty set for the interaction. For example, if the human agent is performing well during the quality management session with the chat robot, the chat robot may choose responses that occur less frequently in the evaluated interactions between human customers and human agents, or responses deemed to be more difficult (e.g., based on negative sentiment). Even further, the corresponding response may be chosen based on the general strategy of the contact center in training or evaluating the agent. For example, the contact center may have a general strategy for training agents based on an "angry customer" scenario for some period of time (e.g., a week, a month, etc.). In this case the corresponding responses may be chosen based on a path in the dialogue tree having the highest negative sentiment, for example.

According to one embodiment, the live chat stream between the customer chat bot 40 and the human agent is provided to the interaction analytics module 110 during the chat session for analysis at operation 240.

The results of the analysis is provided to the QM/coaching module, and the QM/coaching module provides coaching and feedback to the agent at operation 250, upon determining that such coaching and feedback is appropriate. The feedback and/or coaching may be in real-time during the chat session with the automated agent, and/or after completion of the interaction. For example, at the end of the interaction, the chat robot may provide a report, which summarizes the human agent's proficiency such as areas or skills which may need to be improved as well as those areas or skills which meet or exceed expectations. The reports may be sent to the agent, the agent's supervisor, and the quality management system. The quality management system may use the report to update the agent's performance profile (e.g., see FIG. 3). Based on the agent's performance profile, processes such as training, promotion/demotion, compensation, coaching, etc., may be automatically initiated or scheduled. According to an embodiment, the QM/coaching module may also trigger a coaching session, either as a self-coaching session, or a coaching session with the human agent's supervisor.

However, the present invention is not limited thereto. For example, if the human agent's responses for each of the one or more selected topics matches the correct/desired path, the process may loop back to operation 220 to select one or more new topics for further interaction, or operation 250 may be omitted and the QM session may be ended. In this case, coaching and/or feedback may be provided at a later date by a supervisor evaluating the interaction between the human agent and the chat robot.

In one embodiment, if the agent performs well according to the expected or desired responses for the selected topic, the system may make a notation in the agent's profile or record, which may impact the selection of the topic for a next evaluation, for example, to select a different topic. In one embodiment, if the agent has several high grade evaluations, the system may trigger a reward/promotion for the agent.

FIG. 3 is a conceptual layout diagram of an exemplary table that may be used to select one or more topics for the interaction between the chat robot 40 and a particular agent selected for evaluation. The table may be stored in the mass storage device 30 and retrieved by the QM/coaching module 120 in selecting the particular topic for the automated chat session with the particular agent.

According to one embodiment, the table 300 includes a list of possible topics 310 for the interaction between the chat robot and the particular agent. As discussed above, the list of possible topics 310 may be generated by analyzing all of (or some desired amount of) the recorded and/or live conversations (e.g., voice and/or text conversations) between various human customers and various human agents. Based on the detected topics of those interactions, a universal list of topics may be generated as the list of possible topics 310 that may be the subject of an automated chat session between the customer chat bot 40 and a particular human agent.

However, the present invention is not limited thereto, and in some embodiments the list of possible topics 310 may be generated based on all of (or some desired amount of) the recorded and/or live conversations (e.g., voice and/or text conversations) between the particular agent (e.g., the agent selected to be evaluated) and one or more human customers. In this case, the list of possible topics 310 may be continuously or frequently updated based on newly detected topics for the particular agent.

In one embodiment, various factors may be considered in determining the list of possible topics 310 for the particular agent. For example, one factor may be a list of new topics, such as new products, that are common to a group of agents including the particular agent. Another factor, for example, may be a "problematic" topic area that is discoved for the particular agent (e.g., when evaluating the recorded and/or live conversations of the particular agent).

According to one embodiment, the table 300 further includes current performance indicators 320 for the particular agent on each of the possible topics 310. The current performance indicators 320 may be based on evaluations of recent interactions between the particular agent and human customers and/or based on recent automated quality management sessions between the particular agent and the chat robot. A timeframe for the recent interactions/sessions may be any suitable set or predetermined timeframe according to contact center and/or business objectives. For example, the timeframe for the current performance indicators 320 may be based on the most recent interactions for the corresponding topics, or may be based on interactions for the corresponding topics within a unit of an hour, a day, a week, etc., according to quality control guidelines of the contact center or those of a particular business or client of the contact center.

In some embodiments, the table 300 further includes historical performance indicators 330 based on previous quality management sessions with the particular agent by human quality control agents and/or by the chat robot. The historical performance indicators 330 may indicate, for example, a grade for the particular agent's past performance for a particular topic.

According to one embodiment, the current and historical performance indicators 310 and 320 may be considered in choosing the one or more topics from among the list of possible topics 310 for the automated quality management session between the agent and chat robot 40. For example, if any or both of the current or historical performance indicators 310 and 320 fall below a threshold value, a quality management session may be triggered for the agent on those topics that fail to meet the threshold value.

Figure 4:
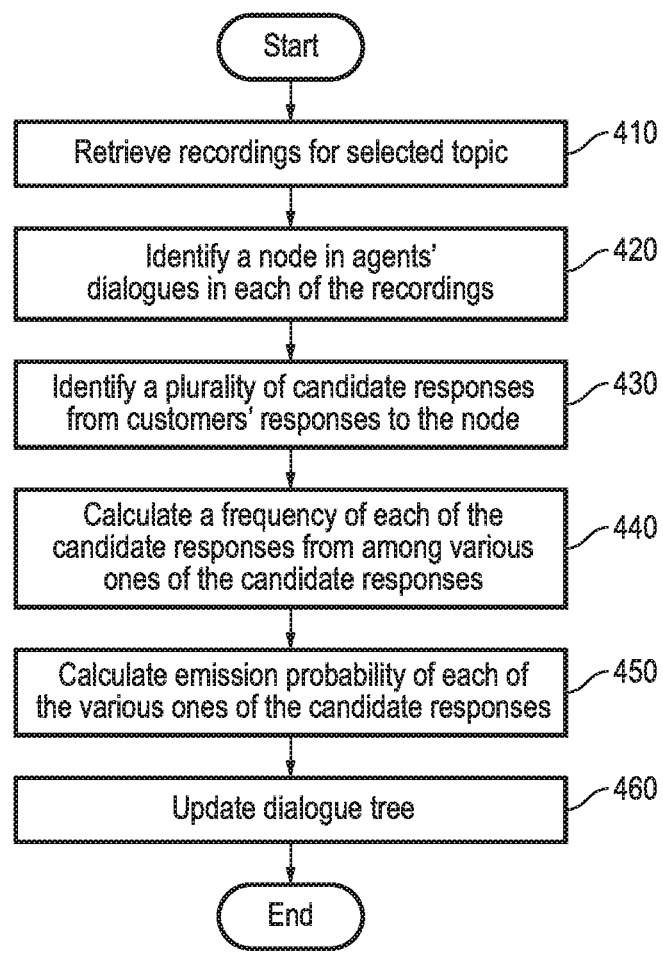
FIG. 4 is a flowchart of a process for generating a dialogue tree for an interaction between a chat robot and a particular agent selected for evaluation according to one embodiment of the invention.

FIG. 4 is a flowchart of a process for generating a dialogue tree for an interaction between a chat robot and a particular agent selected for evaluation according to one embodiment of the invention.

Aspects of dialogue tree generation are described, for example, in U.S. patent application Ser. No. 14/799,369 "Data Driven Speech Enabled Self-Help Systems and Methods of Operating Thereof," filed in the United States Patent and Trademark Office on Jul. 14, 2015, U.S. patent application Ser. No. 14/919,673 "Data-Driven Dialogue Enabled Self-Help Systems," filed in the United States Patent and Trademark Office on Oct. 21, 2015, and U.S. patent application Ser. No. 14/919,675 "Dialogue Flow Optimization and Personalization," filed in the United States Patent and Trademark Office on Oct. 21, 2015, the entire disclosures of which are incorporated herein by reference.

The above-referenced patent applications generally describe systems and methods for generating dialogue trees for self-help systems (or chat robots) that emulate or replace human agents, and thus, the outputs from the system (e.g., the outputs of the chat robot emulating the human agents) are generally predetermined (or fixed) and limited for a given human customer intent. Accordingly, methods for identifying phrases from utterances input from human customers, and matching the phrases with one or more speech grammars to identify an action to take in response to the human customer's utterances are generally described in the above-referenced patent applications.

On the other hand, according to embodiments of the present application, the chat robots 40 are configured to interact with human agents to emulate human customers. Thus, the outputs of the system (e.g., the chat robot's dialogue based on various human customers' dialogues) may be more varied than when the chat bot is emulating a contact center agent, and may also be dependent on the inputs to the system (e.g., the agent's dialogue), which may also vary. For example, the chat robot 40 may test the human agent by mimicking various human customer inputs for the same intent. Accordingly, in embodiments of the present invention, recorded and/or live interactions between human agents and human customers for a particular topic are analyzed to identify all (or some desired amount thereof) of the potential inputs from the particular agent, and all (or some desired amount thereof) of the possible outputs for the chat robot in response to each potential node of the agent's dialogue, to generate one or more dialogue trees and/or sequences for the chat robot for the particular topic (e.g., from the list of possible topics 310 in FIG. 3).

Referring to FIG. 4, when generating a dialogue tree for the particular topic, the recorded and/or live interactions between human customers and human agents are retrieved at block 410.

The recorded and/or live interactions are analyzed to identify each potential node from one or more agents' dialogues in each of the recordings at block 420. In some embodiments, similar utterances in the agents' dialogues may be associated together as one potential node. For example, similar phrases in the agents' dialogue, such as "Can I help you?," "How may I assist you?," "What can I do for you today?," etc., may be identified and associated with each other as belonging to a same potential node. Such association of phrases that are semantically similar is referred to herein as semantic clustering.

For each potential node in the agents' dialogue, a plurality of candidate responses for the chat robot are identified according to various customers' responses to the corresponding node in each of the recorded and/or live interactions. For example, actual human customer responses to the potential node may be analyzed from each of the recorded and/or live interactions to identify various possible responses as candidate responses for the chat robot. Accordingly, the chat robot may emulate actual human customers by outputting actual human responses (or phrases) to each of the potential nodes of the agent's dialogue.

A frequency (or percentage) of each of the candidate responses that occurs in the recorded and/or live interactions is calculated at block 440, and an emission probability of each of the candidate responses occurring in an actual interaction between a human agent and a human customer is calculated at block 450. The emission probability may be analogous to the emission probability in a Hidden Markov Model, and is used to determine the probability of a particular candidate response being uttered by a human customer in response to a particular node in the agent's dialogue. In some embodiments, the emission probability may be determined at run time as the customer chat bot 40 traverses the dialog tree.

The calculated frequency and/or emission probability may be used by the chat robot in determining which ones of the candidate responses (or candidate phrases) to output in response to the input received from the agent.

The dialogue tree for the chat robot is than updated at block 460 for the various candidate responses to the particular node of the agent's dialogue, and a next node is identified, if any, for the process to continue from block 420. If there are no more nodes in the agents' dialogues to analyze (e.g., end of call), the process may end.

According to one embodiment, the dialog sequences that are generated may further be associated with a contact center metric or goal achieved by the dialog sequence, such as, for example, first call resolution, customer satisfaction, compliance with guidelines, policies, and procedures, and the like.

Figure 5:
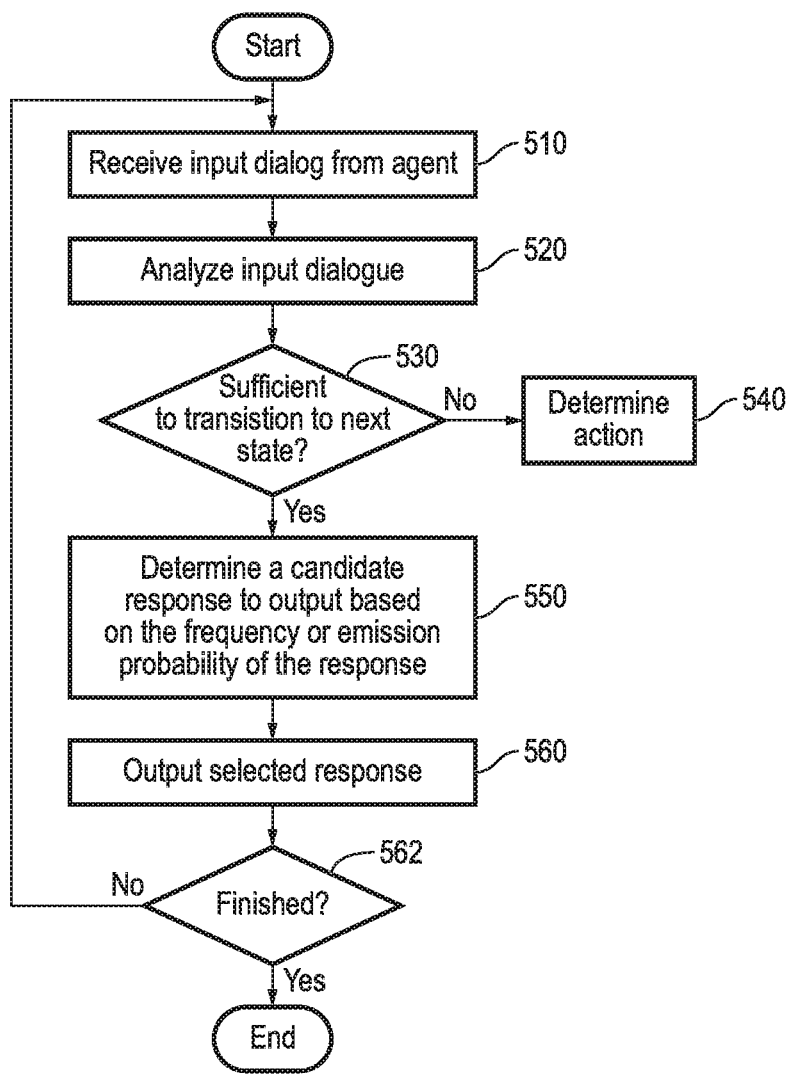
FIG. 5 is a flowchart of a process employed by a customer chat bot in engaging in an automated chat conversation with a human agent according to one embodiment of the invention.

FIG. 5 is a flowchart of a process employed by the customer chat bot 40 in engaging in an automated chat conversation with a human agent according to one embodiment of the invention. The chat conversation may be based on a dialog tree selected by the QM/coaching module 120 for an interaction topic selected for the agent. According to one embodiment, the interaction topic is selected based on a criterion that is desired to be optimized for the contact center. The criterion may be set, for example, by a system administrator. For example, agent performance may be set as the criterion to be optimized by the contact center. In this case, the selected dialog tree may be for a topic for which the agent's performance score is below a pre-set performance threshold in order to train the agent on the particular topic and help improve his performance. In another example, the optimization criterion may be first call (chat) resolution. In this case, the selected dialog tree may be for a combination of frequent topics and topics the agent has a record of poor first call resolution performance. In other embodiments, the dialog tree is chosen at random.

Once the dialog tree is selected, the process starts, and in block 510, the customer chat bot 40 receives an input provided by the human agent for a current node of the dialog tree. The input may be, for example, a dialog (or phrase) provided by the agent in response to an input provided by the customer chat bot. According to one embodiment, the chat bot 40 forwards the received agent input to the interaction analytics module 110 for analysis.

At block 520, the interaction analytics module 110 analyzes the agent input for determining a next action to be taken. In some embodiments, in addition or in lieu of doing the analysis in real time during the automated chat session, the analysis may also be deferred until after completion of the interaction to evaluate the agent's overall performance.

With reference to block 520, the interaction analytics module analyzes a current state of the interaction to determine if the interaction is progressing as expected (or within permissible thresholds). The interaction may be deemed to be progressing as expected or desired if the input from the agent is semantically equivalent, for a current node of the dialog tree, to an expected or target agent input identified by the dialog tree. As such evaluation is made for a sequence of inputs provided by the agent, a determination may be made as to whether the agent is following or deviating from the path identified by the dialog tree. In this regard, the interaction analytics module 110 semantically clusters the input (or inputs) of the agent received currently or thus far, to generate input semantic clusters, and compares the cluster(s) to target semantic clusters corresponding to nodes in the path or paths of a current dialog. If the sequence of the input semantic clusters matches the sequence of the target semantic clusters, the interaction may be deemed to be progressing as expected.

According to some embodiments, the sequence of the target semantic clusters may be learned by analyzing real interactions between real customers and contact center agents, and identifying dialog sequences that resulted in achieving a particular contact center goal. That dialog sequence may then be selected as the target sequence against which the agent's performance is to be measured.

A performance score may then be generated based on a degree of the match or diversion from the target sequence. For example, a score of 100% may be given in response to matching all clusters, whereas a score of 50% may be given in response to only half of the input semantic clusters matching the target semantic clusters. The score may also be weighted based on weights assigned to target nodes from which the input semantic cluster deviated. An agent may be deemed to be performing as desired or expected in response to the score being within a preset performance score.

Aspects of generating the performance score are described, for example, in U.S. patent application Ser. No. 15/282,963 "SYSTEM AND METHOD FOR AUTOMATIC QUALITY EVALUATION OF INTERACTIONS,"

filed in the United States Patent and Trademark Office on Sep. 30, 2016, the entire disclosure of which is incorporated by reference herein.

According to one embodiment, the semantic clustering and comparing may be done at each node of the dialog tree as described above, or at preset milestone nodes that are identified or learned as being more relevant than others to the optimization criteria. For example, if a particular node of the dialog tree indicates that the agent should make an upsell or cross sell offer which may not be related to a current optimization criteria (e.g. first call/chat resolution), the dialog may progress without checking whether the agent made the upsell or cross sell offer.

At block 530, a transition probability is calculated based on the current state to determine whether the agent input is sufficient to transition the interaction to a next state (e.g., a next node in the path of the dialogue tree), or stay in the current state. If the agent input is not sufficient to transition to the next state at block 530, the interaction analytics module 110 (or QM/coaching module 120) may determine an appropriate action at block 540. For example, if the input dialog from the agent is "please wait a few minutes while I get that information from you," the interaction analytics module 110 (or QM/coaching module 120) may determine that the appropriate action is to output a response (or phrase) such as "sure, no problem" at block 540, and then wait until a subsequent input is received to continue the process at block 510. In some embodiments, the action determined at block 540 may be a real-time feedback to the agent and/or his supervisor/coach in response to the performance score calculated based on the agent's response. For example, an alert may be displayed in response to the performance score falling below a set threshold. In some embodiments, no alerts are provided, but the node or nodes that caused the performance score to fall below the preset performance score are flagged for review and follow-up. Reports may also be provided which summarizes the skills in which the agent is proficient (e.g. the correct/desired path was followed) and areas in which the agent needs improvement (e.g. the correct/desired path was not followed). Feedback may be augmented by further analyzing the agent's chat, for example, by examining whether the agent used inappropriate language, analyzing sentiment (e.g., looking for negative sentiment), analyzing agent's response time, and the like. In another example, the appropriate action may be to end the quality management session and/or to initiate a coaching and/or feedback session if the performance score falls below a minimum threshold score.

If the input agent response is determined to be sufficient to transition to a next state (or a next node) within the interaction, a candidate response from among the candidate responses is selected at block 550. For example, the candidate response may be selected based on the emission probability of the candidate response (e.g., see FIG. 4). In some embodiments, the candidate response having the highest emission probability may be selected. In some embodiments, the candidate response having the lowest emission probability may be selected. This may be done, for example, if a difficulty setting for assessing the agent performance is set to be high. In some embodiments, the candidate response having the next highest or next lowest emission probability may be selected (e.g., in order to diversify the quality management session from a previous session on the same topic). In some embodiments, the candidate response may be selected randomly.

The selected response (or phrase) is then output at block 560. In block 562, a determination is made as to whether the automated chat session can terminate. For example, the session may terminate upon both the agent and customer saying "good bye." Otherwise, the process may loop back to block 510 to wait for a subsequent input from the agent.

Figure 6:
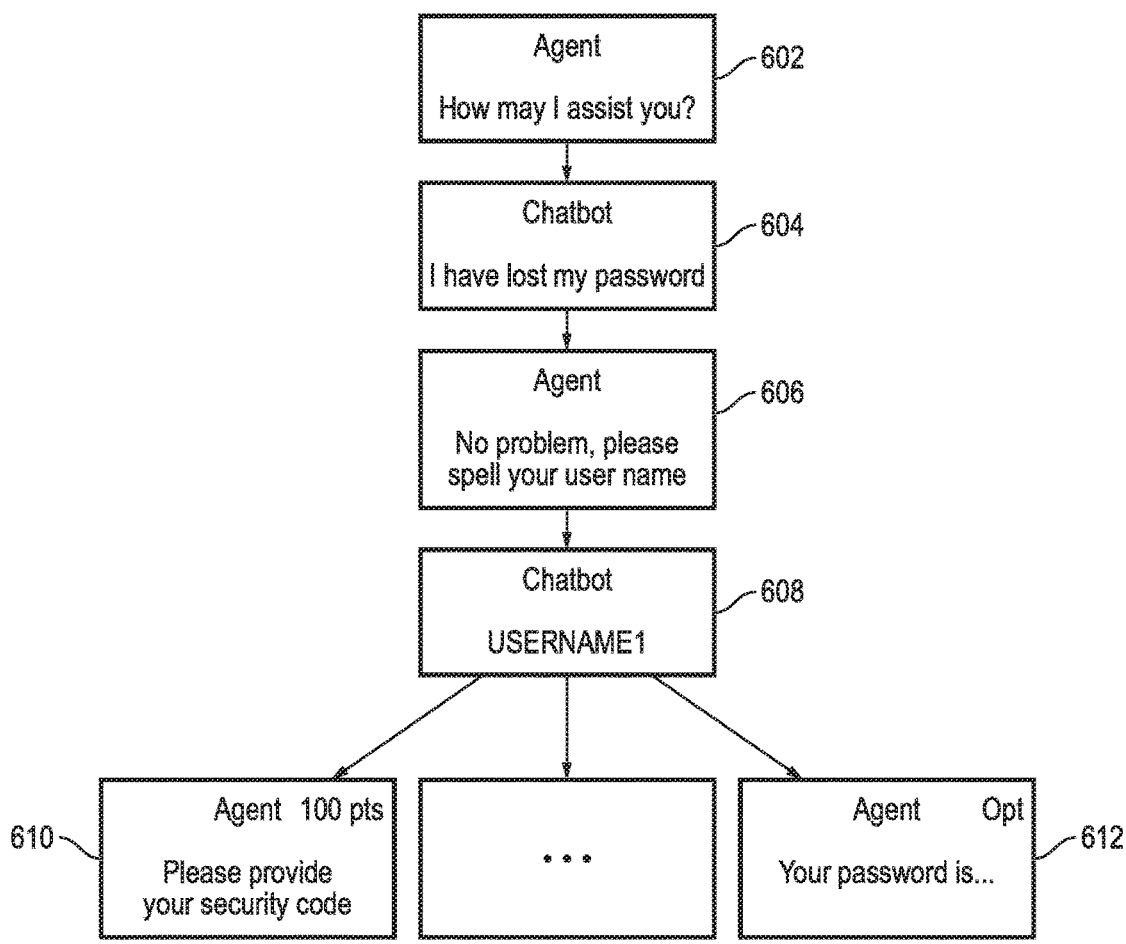
FIG. 6 is an abstract visualization of an example dialogue graph or dialogue tree for an interaction between a particular agent and the customer chat bot.
Figure 6:
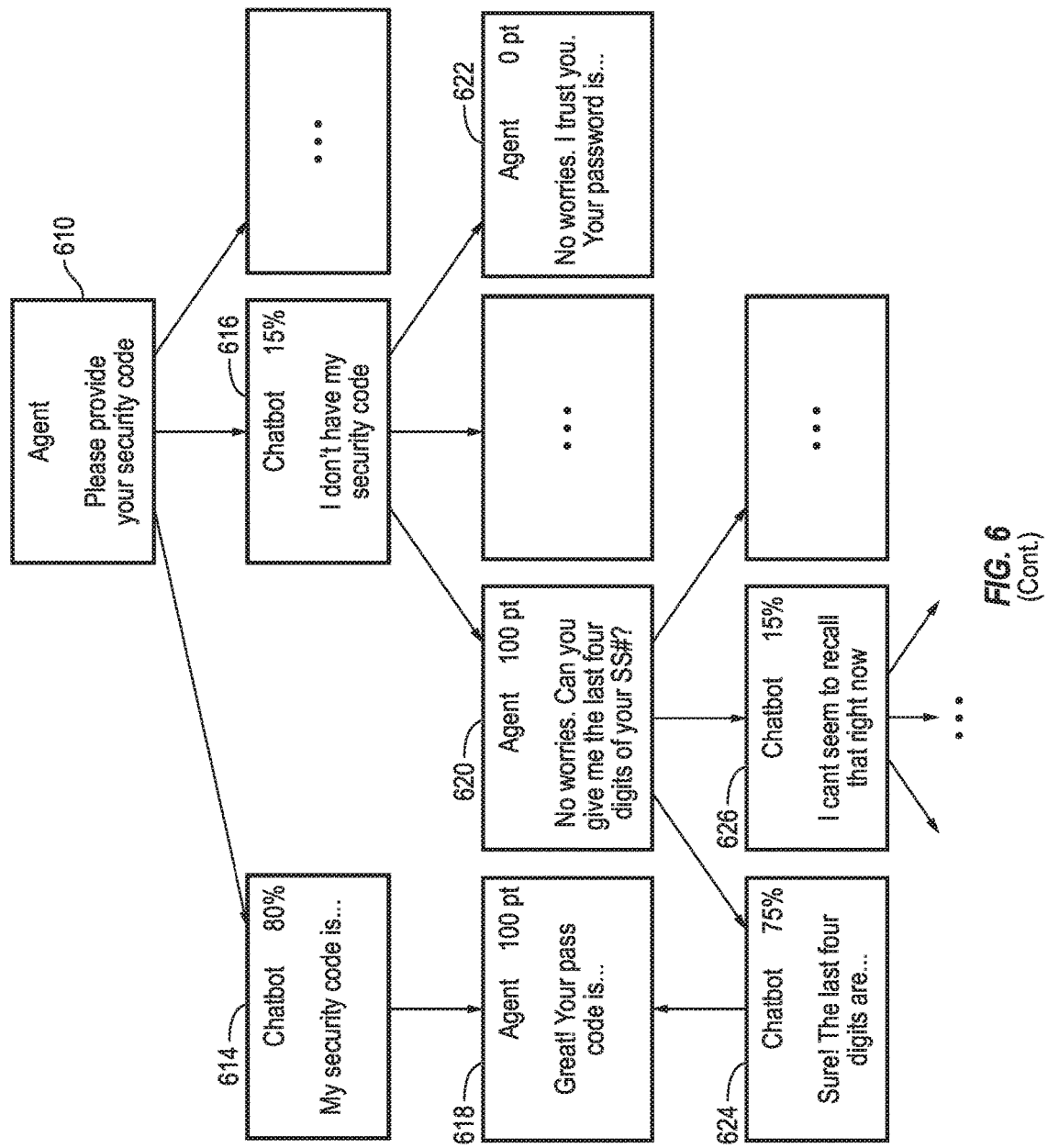

FIG. 6 is an abstract visualization of an example dialogue graph or dialogue tree for an interaction between the particular agent and the chat robot. The various nodes (or layers) of the tree correspond to potential inputs received from the human agent (e.g., potential messages conveyed from the human agent to the chat robot), or potential outputs from the customer chat robot 40 (e.g., the chat robot's potential responses to the human agent's prompts). The dialogue tree of FIG. 6 may correspond to a topic for a "lost password" scenario, in which the chat robot is emulating a customer who has forgotten her login password.

Referring to FIG. 6, in response to a customer chat robot initiating an interaction with a human agent, the human agent may ask "How may I assist you?" at block 602. In response to the question, the chat robot may direct the topic of the interaction at block 604, for example, by outputting "I have lost my password," based on the selected topic.

In response, the agent is expected to respond with "No problem, please spell your username," or some semantically equivalent variation thereof, at block 606. The chat robot then outputs a response (or phrase) by spelling out the username "USERNAME1," at block 608.

Up to this point of the interaction, it is assumed that the dialogues from the evaluated recorded and/or live interactions between human agents and human customers seldomly diverges, if at all, except for the username of the particular customer. However, in response to the output of the username at block 608, it is assumed that the evaluated agents' dialogues start to diverge. According to one embodiment, the dialog tree that is followed in this example takes into account clusters of different agent dialogs that may be possible at this point. The various potential dialog clusters may be represented as one or more nodes of the dialog tree.

Thus, referring to FIGS. 4-6, it is assumed that various potential nodes have been determined from the evaluated interactions in the agents' dialogues (e.g., at block 420 in FIG. 4), and various candidate responses have been determined for each of the potential nodes (e.g., at block 430 in FIG. 4). For example, one potential node that has been determined from the agents' dialogues in the evaluated interactions is to ask for a security code at block 610. Further, because this response is the desired or ideal response, this path in the dialogue tree is associated with the highest number of points or performance score that the agent may receive for correctly outputting the response.

On the other hand, another potential node that has been determined from the evaluated agents' dialogues is to immediately provide the password at block 612, without following appropriate security protocol. This is assumed to be an undesirable or even egregious response, and thus, is associated with a lower (or lowest) number of points or performance score that may be receive for such a response. In some embodiments, such a response may immediately trigger a coaching and/or feedback session (e.g., see block 250 in FIG. 2), and/or a more drastic action (e.g., at block 540 in FIG. 5) may be desired, such as, for example, taking the agent offline and/or preventing further interactions from being routed to the agent.

Referring back to our example, assuming that the agent responds to block 608 by requesting the last four digits of the user's social security number, or some variation thereof, like at block 620, the chat robot may analyze the agent input to determine the current state (e.g., at block 520 in FIG. 5), and may determine a transition probability based on the determined current state (e.g., at block 530 in FIG. 5). However, these processes may be performed a plurality of times.

For example, when analyzing the agent input, the current state may be first determined to be the node of block 608, there being a partial match since both the expected agent input (e.g., block 608) and the received agent input (e.g., block 620) include the term "security" (e.g., "security code" and "social security number"). However, when the transition probability is calculated (e.g., at block 530 in FIG. 5), the transition probability may be determined to be too low (e.g., below a threshold value) to proceed to block 550. Thus, the determined action at block 540 may be to re-analyze the agent input to determine a different current state (e.g., another node) having a higher transition probability.

In this case, the current state may be determined to be the node of block 620, and the transition probability for the node 620 may be determined to satisfy the threshold value (e.g., a better match of the received agent input and the expected agent input at the node 620). However, because the agent input in this scenario diverges from the correct or desired path, the points may be reduced and/or the generated report may reflect the divergence.

Then, a candidate customer response (or phrase) to be output by the customer chat bot 40 is determined from among a plurality of candidate customer outputs (e.g., see block 550 in FIG. 5). For example, from the evaluated interactions, the possible candidate customer outputs may be to simply provide the last 4-digits at block 624, to state that the last 4-digits cannot be recalled at the moment at block 626, or to provide some other candidate customer outputs that may be determined from the evaluated recorded and/or live interactions (e.g., see block 420 in FIG. 4). Further, as shown in FIG. 6, a frequency of occurrence for each of the candidate customer responses in the evaluated interactions are shown (e.g., see block 440 in FIG. 4).

Further, an emission probability may be calculated for each of the candidate customer responses based in part on the frequency of occurrence of the candidate customer response (e.g., see block 450 in FIG. 4 and block 550 in FIG. 5). For example, the emission probability may simply indicate that the candidate customer response with the highest frequency of occurrence should be output. However, the present invention is not limited thereto, and the emission probability may take into consideration factors that are unknown or learned during the interaction to decide which of the candidate customer responses should be output. For example, if the agent is performing very well during the interaction (e.g., scoring high points), or have performed well in previous interactions for the same or similar topic, these factors may be considered in calculating the emission probability to consider outputting the candidate response having a lower frequency of occurrence.

While the above-described embodiments have been discussed with the assumption that the agent is being evaluated by the chat robot under quality control conditions, and thus, the agent does not realize during the interaction that she is dealing with a chat robot, the present invention is not limited thereto. For example, as would be appreciated by those having skill in the arts, the coaching and/or feedback may be provided in real-time or substantially real-time after each agent node, where the tradeoff is that the agent will know that she is interacting with a chat robot instead of a human customer.

Further, for example, one or more embodiments of the present invention may be applicable to a testing tool for agents in training (or agents that have been reprimanded), where the system may be used to realistically and systemically test agents in training before (or even after) they start serving actual human customers. The agents in training may utilize the system to test all possible topics (or some desired amount thereof), and real-time coaching and feedback may be provided to the agents.

As person of skill in the art should recognize that the flow diagrams described in the various embodiments are only exemplary. For example, the present invention is not limited to the sequence or number of the operations shown in the various flow diagrams, and the sequence or number of the operations can be altered into any desired sequence or number of operations as recognized by a person of ordinary skill in the art. For example, in some embodiments, the order may vary, or the method may include fewer or additional operations.

FIGS. 7A to 7D are block diagrams of computing devices according to example embodiments of the present invention. FIG. 7E is a block diagram of a network environment including several computing devices according to an example embodiment of the present invention.

In one embodiment, each of the various servers, controllers, switches, gateways, engines, and/or modules (collectively referred to as servers) in the afore-described figures are implemented via hardware or firmware (e.g. ASIC) as will be appreciated by a person of skill in the art.

In one embodiment, each of the various servers, controllers, engines, and/or modules (collectively referred to as servers) in the afore-described figures may be a process or thread, running on one or more processors, in one or more computing devices 1500 (e.g., FIG. 7A, FIG. 7B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments of the present invention, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Figure 7A:
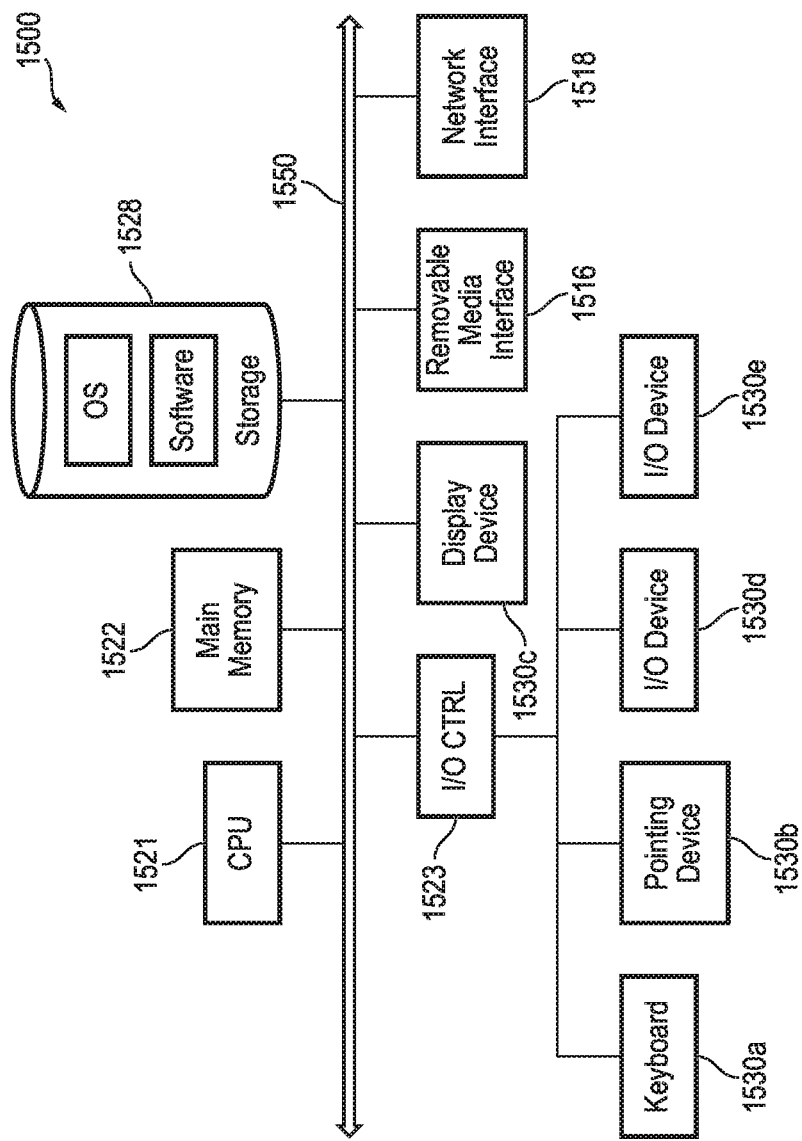
FIG. 7A is a block diagram of a computing device according to an exemplary embodiment of the present invention.
Figure 7B:
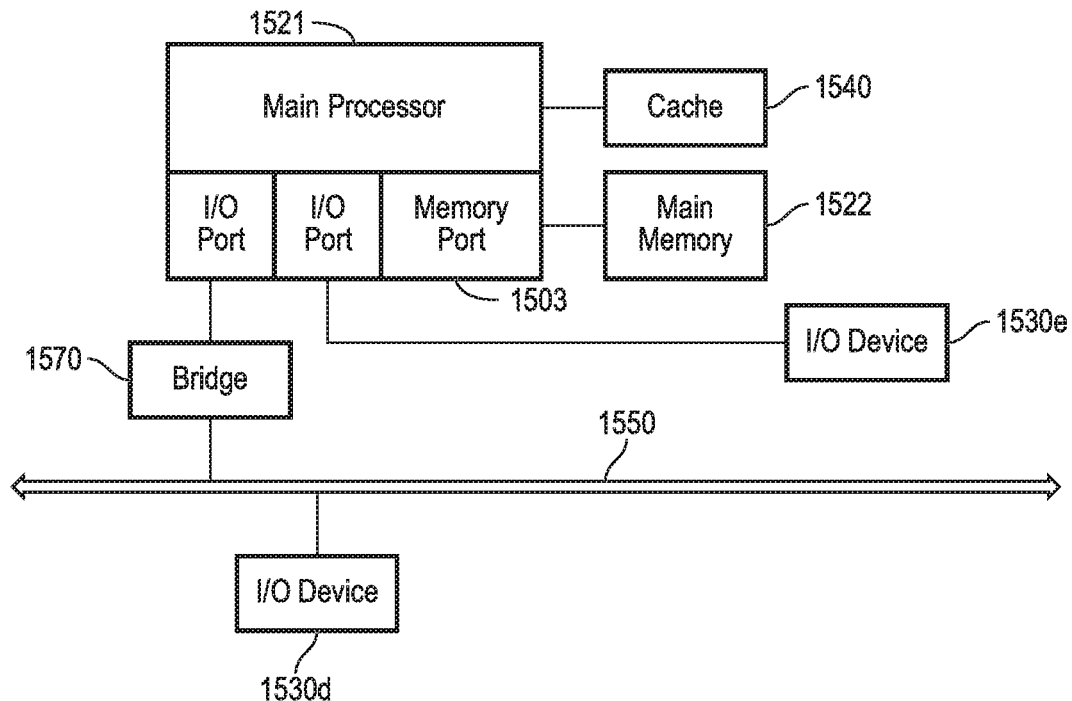
FIG. 7B is a block diagram of a computing device according to an exemplary embodiment of the present invention.

FIG. 7A and FIG. 7B depict block diagrams of a computing device 1500 as may be employed in exemplary embodiments of the present invention. Each computing device 1500 includes a central processing unit 1521 and a main memory unit 1522. As shown in FIG. 7A, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 7B, each computing device 1500 may also include additional optional elements, such as a memory port 1503, a bridge 1570, one or more additional input/output devices 1530d, 1530e and a cache memory 1540 in communication with the central processing unit 1521. The input/output devices 1530a, 1530b, 1530d, and 1530e may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 7A, the central processing unit 1521 communicates with the main memory 1522 via a system bus 1550. As shown in FIG. 7B, the central processing unit 1521 may also communicate directly with the main memory 1522 via a memory port 1503.

FIG. 7B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 7A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530c, the central processing unit 1521 may communicate with the display device 1530c through an Advanced Graphics Port (AGP). FIG. 7B depicts an embodiment of a computer 1500 in which the central processing unit 1521 communicates directly with I/O device 1530e. FIG. 7B also depicts an embodiment in which local busses and direct communication are mixed: the central processing unit 1521 communicates with I/O device 1530d using a local system bus 1550 while communicating with I/O device 1530e directly.

A wide variety of I/O devices 1530 may be present in the computing device 1500. Input devices include one or more keyboards 1530a, mice, trackpads, trackballs, microphones, and drawing tablets. Output devices include video display devices 1530c, speakers, and printers. An I/O controller 1523, as shown in FIG. 7A, may control the I/O devices. The I/O controller may control one or more I/O devices such as a keyboard 1530a and a pointing device 1530b, e.g., a mouse or optical pen.

Referring again to FIG. 7A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further comprise a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may comprise or be connected to multiple display devices 1530c, which each may be of the same or different type and/or form. As such, any of the I/O devices 1530 and/or the I/O controller 1523 may comprise any type and/or form of suitable hardware, software, or combination of hardware and software to support, enable or provide for the connection to, and use of, multiple display devices 1530c by the computing device 1500. For example, the computing device 1500 may include any type and/or form of video adapter, video card, driver, and/or library to interface, communicate, connect or otherwise use the display devices 1530c. In one embodiment, a video adapter may comprise multiple connectors to interface to multiple display devices 1530c. In other embodiments, the computing device 1500 may include multiple video adapters, with each video adapter connected to one or more of the display devices 1530c. In some embodiments, any portion of the operating system of the computing device 1500 may be configured for using multiple display devices 1530c. In other embodiments, one or more of the display devices 1530c may be provided by one or more other computing devices, connected, for example, to the computing device 1500 via a network. These embodiments may include any type of software designed and constructed to use the display device of another computing device as a second display device 1530c for the computing device 1500. One of ordinary skill in the art will recognize and appreciate the various ways and embodiments that a computing device 1500 may be configured to have multiple display devices 1530c.

A computing device 1500 of the sort depicted in FIG. 7A and FIG. 7B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 comprises a combination of devices, such as a mobile phone combined with a digital audio player or portable media player.

Figure 7C:
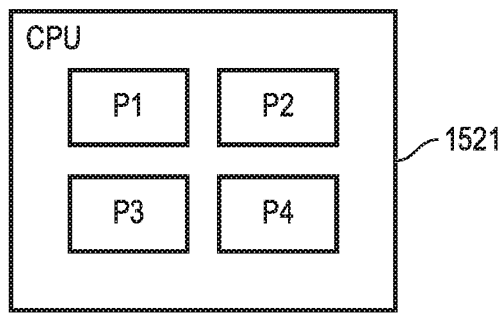
FIG. 7C is a block diagram of a computing device according to an exemplary embodiment of the present invention.
Figure 7D:
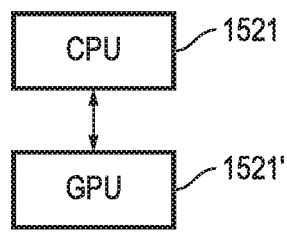
FIG. 7D is a block diagram of a computing device according to an exemplary embodiment of the present invention.
Figure 7E:
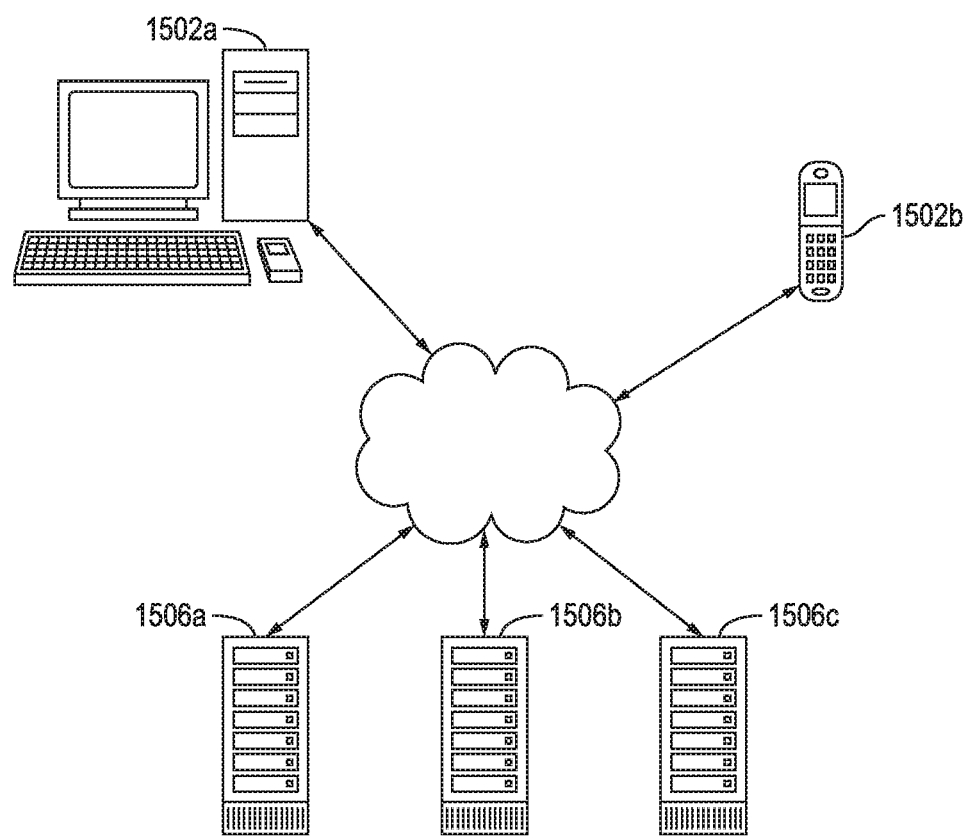
FIG. 7E is a block diagram of a network environment including several computing devices according to an exemplary embodiment of the present invention.

As shown in FIG. 7C, the central processing unit 1521 may comprise multiple processors P1, P2, P3, P4, and may provide functionality for simultaneous execution of instructions or for simultaneous execution of one instruction on more than one piece of data. In some embodiments, the computing device 1500 may comprise a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 comprises a multicore microprocessor, which combines two or more independent processors into a single package, e.g., into a single integrated circuit (IC). In one exemplary embodiment, depicted in FIG. 7D, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

A computing device may be one of a plurality of machines connected by a network, or it may comprise a plurality of machines so connected. FIG. 7E shows an exemplary network environment. The network environment comprises one or more local machines 1502a, 1502b (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506a, 1506b, 1506c (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502a, 1502b. Although only two clients 1502 and three server machines 1506 are illustrated in FIG. 7E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may comprise a built-in network adapter, such as a network interface card, suitable for interfacing the computing device 1500 to any type of network capable of communication and performing the operations described herein. An I/O device 1530 may be a bridge between the system bus 1550 and an external communication bus.

According to one embodiment, the network environment of FIG. 7E may be a virtual network environment where the various components of the network are virtualized. For example, the various machines 1502 may be virtual machines implemented as a software-based computer running on a physical machine. The virtual machines may share the same operating system. In other embodiments, different operating system may be run on each virtual machine instance. According to one embodiment, a "hypervisor" type of virtualization is implemented where multiple virtual machines run on the same host physical machine, each acting as if it has its own dedicated box. Of course, the virtual machines may also run on different host physical machines.

Other types of virtualization is also contemplated, such as, for example, the network (e.g. via Software Defined Networking (SDN)). Functions, such as functions of the session border controller and other types of functions, may also be virtualized, such as, for example, via Network Functions Virtualization (NFV).

Accordingly, in one or more embodiments of the present invention, an automated chat robot is used to interact with a human agent by emulating human customer responses. The human customer responses may be learned from evaluating recorded and/or live interactions between one or more human agents and one or more human customers. The responses may also be manually configured by a designer of dialog trees. The chat robot may evaluate the agent during the interaction, and may provide a report to the agent after the interaction. Further, the chat robot may initiate coaching or other processes in response to the evaluation of the agent.

Although the present invention has been described with reference to the example embodiments, those skilled in the art will recognize that various changes and modifications to the described embodiments may be performed, all without departing from the spirit and scope of the present invention. Descriptions of features or aspects within each example embodiment should typically be considered as available for other similar features or aspects in other example embodiments. Furthermore, those skilled in the various arts will recognize that the present invention described herein will suggest solutions to other tasks and adaptations for other applications. It is the applicant's intention to cover by the claims herein, all such uses of the present invention, and those changes and modifications which could be made to the example embodiments of the present invention herein chosen for the purpose of disclosure, all without departing from the spirit and scope of the present invention. Thus, the example embodiments of the present invention should be considered in all respects as illustrative and not restrictive, with the spirit and scope of the present invention being indicated by the appended claims, and their equivalents.

What is claimed is:

1. A method for automated quality management of agents of a contact center, the method comprising:
    selecting, by a processor, a topic for interacting with a human agent of the contact center;
    identifying, by the processor, a dialog tree associated with the selected topic; and
    engaging, by the processor, in an automated communication session with the human agent based on the identified dialog tree, wherein the engaging of the automated communication session includes:
        receiving, by the processor, an input from the human agent;
        identifying, by the processor, a current node of the dialog tree associated with the input;
        selecting, by the processor, an automated phrase to be output in response to identifying the current node; and
        outputting, by the processor, the automated phrase.

2. The method of claim 1, further comprising:
    identifying, by the processor, a target agent input associated with the identified current node;
    semantically comparing, by the processor, the agent input to the target agent input;
    determining, by the processor, whether the agent input is semantically equivalent to the target agent input;
    calculating, by the processor, a performance score for the human agent based on the determining; and
    outputting, by the processor, feedback based on the determined performance score.

3. The method of claim 2, wherein the feedback comprises a report summarizing the human agent's proficiencies and/or areas of improvement.

4. The method of claim 2, further comprising:
    invoking, by the processor, a coaching session for the human agent based on the feedback.

5. The method of claim 1, wherein the automated phrase is selected from a plurality of phrases provided by human customers for a current dialog state during interactions with agents of the contact center, the interactions relating to the selected topic.

6. The method of claim 5, wherein the selecting of the automated phrase further comprises:
    identifying, by the processor, frequency of each of the plurality of phrases for the current dialog state; and
    selecting, by the processor, one of the plurality of the phrases based on the identified frequency.

7. The method of claim 1, wherein the topic is selected based on a criterion to be optimized by the contact center.

8. The method of claim 1, wherein the topic is selected based on performance of the human agent during interactions with human customers relating to the topic.

9. The method of claim 1, wherein the topic is selected based on performance of the human agent during previous automated communication sessions.

10. The method of claim 1, wherein the automated communication session is a text based chat session.

11. A system for automated quality management of agents of a contact center, comprising:
    a processor; and
    a memory coupled to the processor and storing instructions that, when executed by the processor, cause the processor to:
        select a topic for interacting with a human agent of the contact center;
        identify a dialog tree associated with the selected topic; and
        engage in an automated communication session with the human agent based on the identified dialog tree, wherein the engaging of the automated communication session includes:
            receiving an input from the human agent;
            identifying a current node of the dialog tree associated with the agent input;
            selecting an automated phrase to be output in response to identifying the current node; and
            outputting the automated phrase.

12. The system of claim 11, wherein the instructions further cause the processor to:
    identify a target agent input associated with the identified current node;
    semantically compare the agent input to the target agent input;
    determine whether the agent input is semantically equivalent to the target agent input;
    calculate a performance score for the human agent based on the determining; and
    output feedback based on the determined performance score.

13. The system of claim 12, wherein the feedback comprises a report summarizing the human agent's proficiencies and/or areas of improvement.

14. The system of claim 12, wherein the instructions further cause the processor to:
    invoke a coaching session for the human agent based on the feedback.

15. The system of claim 11, wherein the automated phrase is selected from a plurality of phrases provided by human customers for a current dialog state during interactions with agents of the contact center, the interactions relating to the selected topic.

16. The system of claim 15, wherein the selecting of the automated phrase further comprises:
    identifying frequency of each of the plurality of phrases for the current dialog state; and
    selecting one of the plurality of the phrases based on the identified frequency.

17. The system of claim 11, wherein the topic is selected based on a criterion to be optimized by the contact center.

18. The system of claim 11, wherein the topic is selected based on performance of the human agent during interactions with human customers relating to the topic.

19. The system of claim 11, wherein the topic is selected based on performance of the human agent during previous automated communication sessions.

20. The system of claim 11, wherein the automated communication session is a text based chat session.

* * * * *